(12) United States Patent
Fritsche

(10) Patent No.: US 9,688,210 B2
(45) Date of Patent: Jun. 27, 2017

(54) ROOF BOX FOR A VEHICLE

(71) Applicant: Thule Sweden AB, Hillerstorp (SE)

(72) Inventor: Günther Fritsche, Postbauer (DE)

(73) Assignee: THULE SWEDEN AB, Hillerstorp (SE)

( * ) Notice: Subject to any disclaimer, the term of this patent is extended or adjusted under 35 U.S.C. 154(b) by 0 days.

(21) Appl. No.: 14/426,109

(22) PCT Filed: Sep. 6, 2013

(86) PCT No.: PCT/EP2013/068489
§ 371 (c)(1),
(2) Date: Mar. 4, 2015

(87) PCT Pub. No.: WO2014/037513
PCT Pub. Date: Mar. 13, 2014

(65) Prior Publication Data
US 2015/0210221 A1    Jul. 30, 2015

(30) Foreign Application Priority Data

Sep. 10, 2012  (EP) ..................................... 12183756

(51) Int. Cl.
*B60R 9/055*  (2006.01)
(52) U.S. Cl.
CPC .................................. *B60R 9/055* (2013.01)
(58) Field of Classification Search
CPC .................................................. B60R 9/055
USPC ..................... 224/328, 324, 917.5, 637–641
See application file for complete search history.

(56) References Cited

U.S. PATENT DOCUMENTS

| 3,744,687 | A | * | 7/1973 | Oreck | ..................... | F41C 33/06 |
| | | | | | | 220/8 |
| 3,767,036 | A | * | 10/1973 | McLeod | ............... | A63C 11/027 |
| | | | | | | 206/223 |
| 4,168,542 | A | * | 9/1979 | Small | ....................... | A42B 3/20 |
| | | | | | | 2/424 |
| 4,953,773 | A | * | 9/1990 | Wirth | .................. | A63C 11/027 |
| | | | | | | 206/315.1 |
| 5,096,104 | A | * | 3/1992 | Wirth | .................. | A63C 11/027 |
| | | | | | | 206/315.1 |

(Continued)

FOREIGN PATENT DOCUMENTS

| DE | 22 39 120 | 2/1974 |
| DE | 20 2008 000 734 | 5/2008 |

(Continued)

OTHER PUBLICATIONS

DE202008000734 Machine Translation.*

(Continued)

*Primary Examiner* — Adam Waggenspack
(74) *Attorney, Agent, or Firm* — Sterne, Kessler, Goldstein & Fox P.L.L.C.

(57) ABSTRACT

A roof box for a vehicle, the roof box including a base portion with a load receiving area. The base portion is adapted to be positioned in the proximity of a roof of a vehicle. A closable lid or net is adapted to retain cargo on the load receiving area of the base portion. The base portion of the roof box includes a load stop. The load stop of the base portion effectively prevents, or at least reduces the risk of cargo, such as skis or the like, from penetrating through the roof box in case of a collision or crash.

19 Claims, 3 Drawing Sheets

(56) References Cited

U.S. PATENT DOCUMENTS

| | | | | |
|---|---|---|---|---|
| 5,285,942 | A | * | 2/1994 | Wills .................. A63C 11/026 220/4.22 |
| 5,685,450 | A | * | 11/1997 | Uda .................. B65D 88/1625 220/23.9 |
| 6,336,460 | B2 | * | 1/2002 | Yuhara ................ A45C 13/008 132/295 |
| 7,314,051 | B2 | * | 1/2008 | Yuhara ................ A45D 33/006 132/294 |
| 2011/0240692 | A1 | * | 10/2011 | Park ........................ A45C 5/02 224/155 |
| 2012/0058289 | A1 | * | 3/2012 | Coates .................... B32B 5/26 428/41.8 |

FOREIGN PATENT DOCUMENTS

| | | | |
|---|---|---|---|
| DE | 202008000734 | * | 5/2008 |
| EP | 2 468 578 | | 6/2012 |
| FR | 2 880 601 | | 7/2006 |
| WO | WO 2013/070134 | | 5/2013 |

OTHER PUBLICATIONS

European Search Report for European Application No. 12 18 3756, European Patent Office, Berlin, Germany, mailing date of Feb. 21, 2013, 6 pages.

Written Opinion of the International Searching Authority for International Appl. No. PCT/EP2013/068489, European Patent Office, Berlin, Germany, 4 pages.

\* cited by examiner

ROOF BOX FOR A VEHICLE

FIELD

A roof box for a vehicle comprising a safety arrangement to prevent load from escaping the roof box in case of an accident or a sudden retardation of the vehicle.

BACKGROUND

Roof boxes are generally used to transport luggage, cargo, or other objects usable to man, by mounting the roof box on the roof of a vehicle, usually via a roof rack. Roof boxes can be manufactured in a wide variety of materials although thermoplastics are the most common material used up to date. One way of manufacturing a roof box is to form mold a base portion and a lid as separate pieces, and thereafter pivotally connect the lid to the base portion to form a closeable confided luggage and storage compartment. As a consequence of the manufacturing method, the stability and strength of the roof box has generally been limited to the stability and strength of the form molded pieces themselves.

Although roof box manufacturers has developed roof boxes which meet high requirements concerning safety, stability and strength, there are situations which cannot be fully anticipated and which impose structural demands to the roof box which are difficult to predict or meet. One such situation is a crash scenario, in which the vehicle crashes or collides with another object. Objects which are not sufficiently secured inside of the roof box, e.g. by using cargo nets or straps or the like, can accidentally be forced through the roof box wall and out to the ambient environment, due to their inherent inertia during a crash or collision. This is especially the case for relatively heavy sports equipment such as skies or snowboards.

The published document DE 202008000734U1 disclose a roof box with an absorbing member adapted to absorbed the kinetic energy which an object has during a crash, to prevent the object from escaping or damaging the roof box. The absorbing member has a bow shaped form and is attached to the side walls of the base portion using screws. The solution is however not very efficiently dispersing the absorbed kinetic energy into the base portion as might be wanted.

SUMMARY

It is an object of the present invention to remove, or reduce the drawbacks of the above mentioned prior art, or to at least find a useful alternative. The objects are at least partly met by a roof box for a vehicle. The roof box comprises a base portion comprising a load receiving area and is adapted to be positioned in the proximity of a roof of a vehicle. A closable lid or net is adapted to retain cargo on the load receiving area of the base portion. The base portion of the roof box comprises a load stop comprising a floor portion, wherein the floor portion is adhered to the load receiving area of the base portion.

The roof box has the advantage of not require any structural weak points, such as screw holes, in the base portion. It further transfers any kinetic energy imparted to the load stop from a displaced object inside of the roof box, in an advantageous manner, as the whole adhered surface transfers force to the base portion of the roof box. Furthermore, as the floor portion of the load stop is at least adhered to the load receiving area of the base portion, it is a very robust solution.

According to an aspect, the roof box comprises a front end and a rear end, the load stop is positioned in the front end of the roof box and/or in the rear end of the roof box. The roof box can thus be reinforced and prepared for front collisions and/ or rear collisions.

According to an aspect, the floor portion of the load stop has an area of from 3-20%, advantageous of from 5-15% of the load receiving area of the roof box. A large floor portion area of the load stop permits kinetic energy imparted from an object during a collision to be easily transferred to the underlying load receiving area and the base portion of the roof box.

According to an aspect, the base portion comprises a periphery wall, and in that the load stop is further adhered to the periphery wall of the base portion of the roof box. Additional strength and stability is provided by adhering the load stop to the periphery wall.

According to an aspect, the load stop is manufactured from a first material and the base portion of the roof box is manufactured from a second material, the first material being different from the second material. The load stop can be manufactured from a first thermoplastic material, and the base portion can be manufactured from a second thermoplastic material for example. The load stop is advantageously manufactured from a thermoplastic which is at least more rigid than the base portion as it is believed that this assists in transferring imparted forces from the load stop to the base portion.

According to an aspect, the thermoplastic material which the load stop can be manufactured from is selected from the list of polycarbonates (PC), polymethyl methacrylate (PMMA), Acrylonitrile butadiene styrene (ABS), Polypropylene (PP), Polystyrene (PS), Polysulfone (PSU), Polytrimethylene terephthalate (PTT), Polyurethane (PU), Polyvinyl chloride (PVC), Polyvinylidene chloride (PVDC), Styrene-acrylonitrile (SAN), polyphenylene (SRP), or the like, or mixtures thereof.

According to an aspect, the thermoplastic material which the load stop is manufactured from has a tensile strength of at least 40 MPa as measured by ASTM D 638. In an embodiment, the tensile strength of the thermoplastic which the load stop is manufactured from is higher than the tensile strength of the thermoplastic material which the base portion is manufactured from.

According to an aspect, the load stop comprises a floor portion adhered to the load receiving area of the base portion, a roof portion, and a first and a second side wall extending between the floor portion and the roof portion of the load stop and a front portion. The floor portion, roof portion, front portion and the first and the second side wall defines a load receiving void with an opening.

According to an aspect, the load stop is adhered by means of an adhesive selected from the list of: pressure sensitive adhesives, contact adhesives, hot adhesive or hot melt adhesives, reactive adhesives one part, two parts or the like, synthetic adhesives or the like, or mixtures thereof.

According to an aspect, the load stop is adhered by means of an adhesive selected from the list of: Cyanoacrylate, Polyurethane, Epoxy and/or Acrylic adhesive.

According to an aspect, the load stop is adhered using an intermittent adhesive pattern.

The load stop which is adhered to the base portion is effectively preventing, or at least reducing the risk of, objects, such as skies, snowboards, or the like, from penetrating through the roof box in case of a collision or crash, i.e. a heavy retardation of the vehicle.

BRIEF DESCRIPTION OF THE DRAWINGS

Non-limiting embodiments of the present invention are described in greater detail with reference to the accompanying Figures.

DETAILED DESCRIPTION

Figure 1:
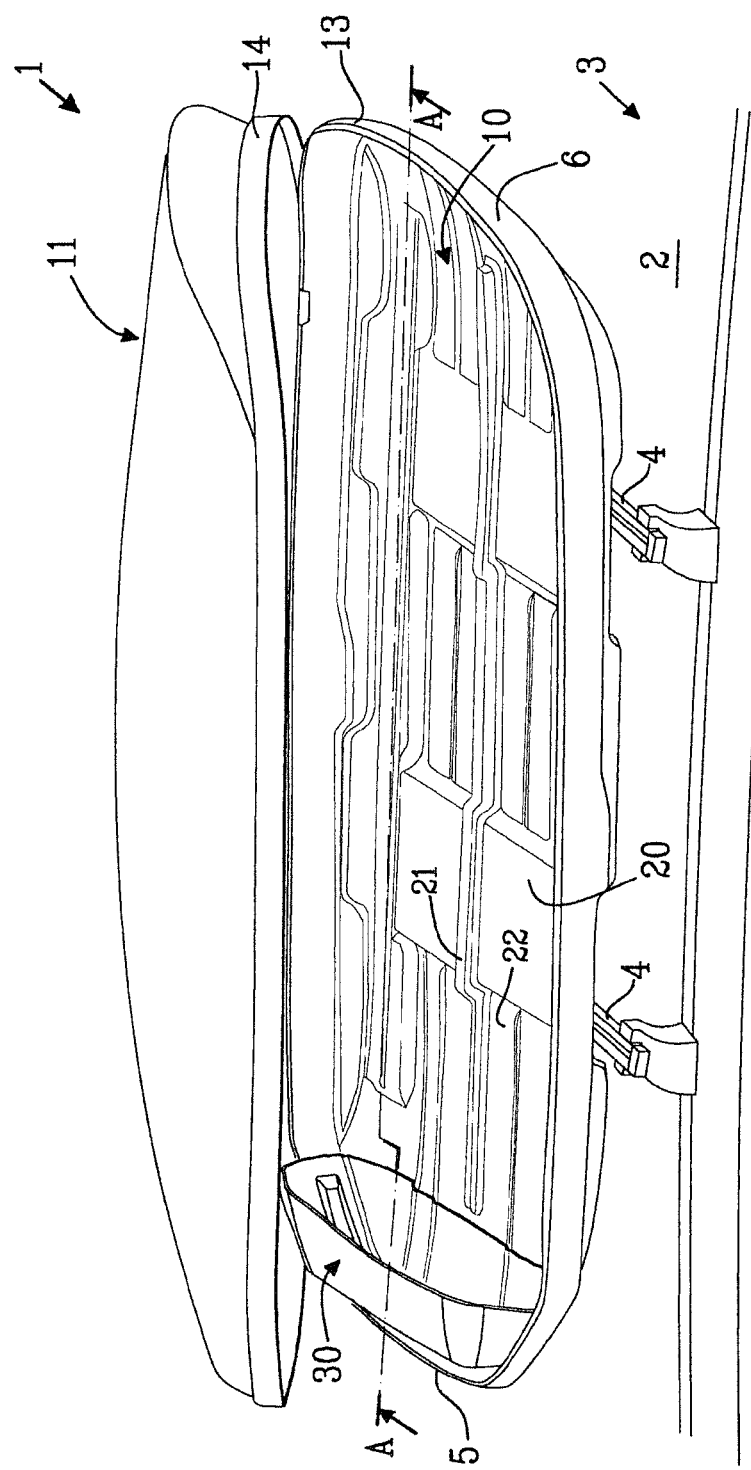
FIG. 1 shows a roof box comprising a base portion, a lid and a load stop, shown in perspective and with a view into onto the load receiving area of the roof box.

FIG. 1 shows a roof box 1 adapted to be attached to a roof 2 of a vehicle 3, directly or via a roof rack arrangement 4. The roof rack arrangement 4 is of conventional type and will not be described further herein. The roof box 1 comprises a base portion 10 adapted to be positioned in the proximity of the roof 2 of the vehicle 3, a closeable lid 11 hereafter only referred to as the lid 11. The lid 11 is pivotally connected to the base portion 10 via hinges (not shown). Other attachment means, instead of hinges, are possible such as straps, slide rails or flexible sections or the like. The lid 11 could in one embodiment be fully detachable form the base portion 10. In an embodiment, the lid 11 can be replaced by a cargo net, or a flexible cover, or similar, although a lid is preferable.

The base portion 10 comprises a periphery wall 13 defining a load receiving area 20 within the space formed but the periphery wall 13. The lid 11 comprises a rim 14 which engages the periphery wall 13 of the base portion when closed, to enclose any objects positioned in the roof box 1. The roof box 1 further has a front end 5 and a read end 6. The front end 5 is intended to point in the primary direction of travel, i.e. towards the front of the vehicle 3, while the rear end 6 is intended to point to the rear of the vehicle 3.

The base portion 10 of the roof box 1 comprises channels 21 and ridges 22 which extend along the longitudinal direction of the roof box 1 to provide a rigid base portion 10.

The base portion 10 comprises a load stop 30. The load stop 30 is intended to prevent any objects positioned in the roof box 1 from penetrating through the front end 5 of the roof box 1 and escape to the ambient environment in case of an accident such as a vehicle crash, vehicle collision or the like, or in case of heavy and/or sudden retardation of the vehicle.

Figure 2:
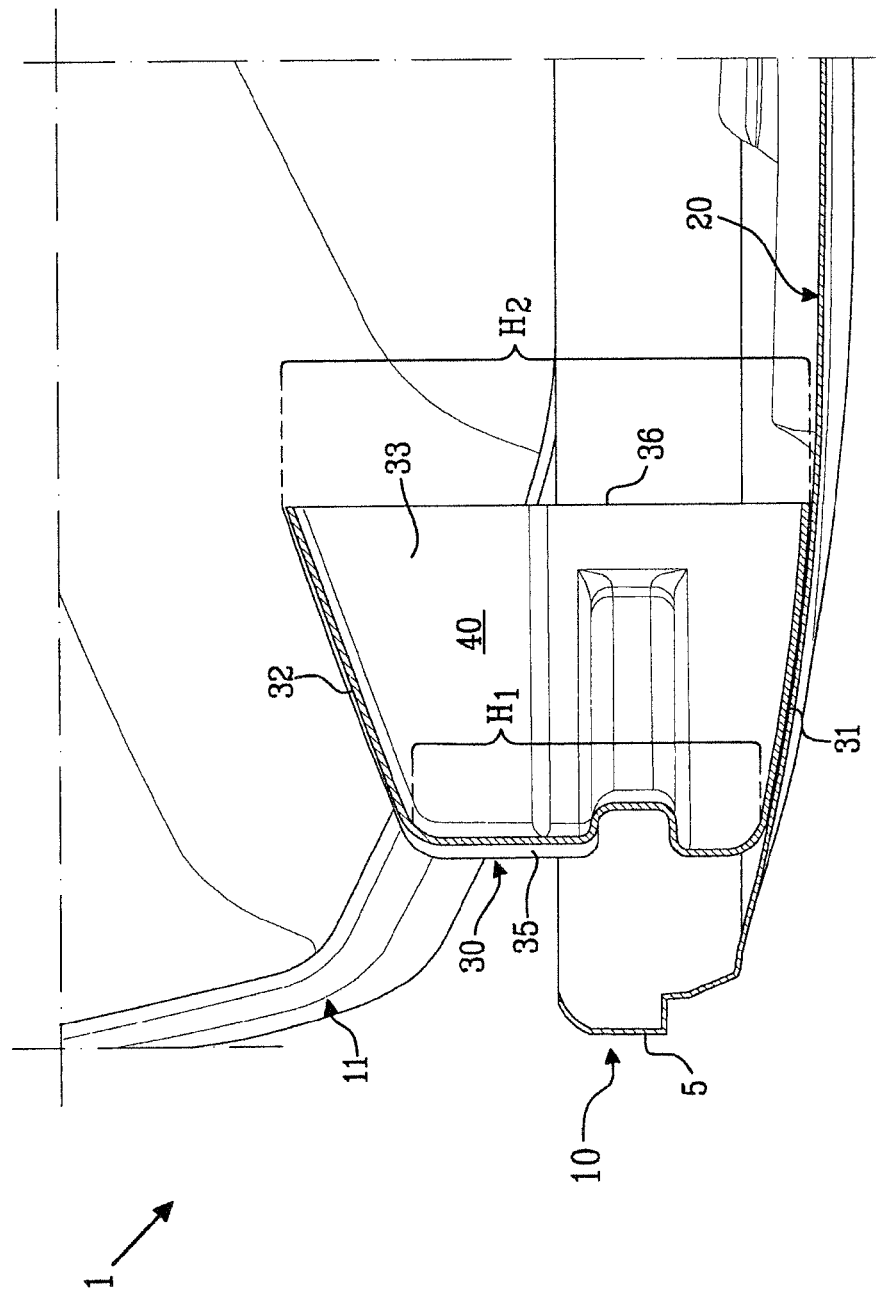
FIG. 2 shows a cross section of the roof box of FIG. 1 along the line A-A.

FIG. 2 shows a cross section along the line A-A of FIG. 1 and with the front end 5 of the rood box in greater detail. FIG. 2 shows parts of the base portion 10, parts of the lid 11, the load receiving area 20 and the load stop 30. The load stop 30 comprises a floor portion 31, a roof portion 32, a first side wall 33 arranged opposite a similar side wall 34 (not shown in FIG. 2). The load stop further comprises a front wall 35 and an opening 36. The floor portion 31, the roof portion 32, the first and the second side wall 33, 34 and the front portion 35 defines a load receiving void 40. The opening 36 is positioned towards the rear end 6 of the roof box 1, and is intended to catch any loose objects sliding in the roof box 1 in a bucket like manner. It is of course possible that the load stop 30 simply braces the load inside of the roof box 1.

As is notable, the floor portion 31, the roof portion 32, the first and the second side wall 33, 34 and the front portion 35 has a form and shape which substantially corresponds to the interior form and shape of the base portion 10 and the lid 11 at the front end 5 of the roof box 1. In an embodiment, at least the floor portion 31 has a shape and form which corresponds to the shape and form of the load receiving area 20 at the front end 5 of the base portion 10 of the roof box 1.

In the shown embodiment, the load stop 30 is formed in one unitary piece of material which has been adhered to the base portion 10 of the roof box 1, and specifically the load receiving area 20 of the base portion 10 of the roof box 1. The area of the floor portion 31 is substantially 10% of the load receiving area 20 of the base portion 10. The load stop 30 can thus be adapted to cover from 3-20%, advantageous from 5-15% of the load receiving area 20 of the roof box 1.

In an embodiment, the load stop 30 can be formed by at least two individual sections which together form a load stop. A first section can be arranged to the lid 11 and a second section can be arranged to the base portion for example. In the latter embodiment, when the lid 11 is closed, the load stop forms a load receiving void.

An advantage of having a load receiving void formed by a floor portion 31, a roof portion 32, a first and the second side wall 33, 34 and a front portion 35 is that the forces imparted to the load stop 30 by the inherent kinetic energy of an object, in case of a collision or similar, is spread or dispersed in an advantageous manner. Further, as the load stop 30 is positioned substantially adjacent the lid 11 of the roof box 1, and the periphery wall 13 of the base portion 10, and attached to the base portion 10 of the roof box 1, if the load stop 30 is temporarily deformed, the adjacent section of the roof box 1 will effectively support the load stop 30 from further deformation and act as a support element to the load stop 30.

In the shown embodiment of FIG. 2, it can be noticed that the front wall 35 has a height H1 and the opening 36 of the load stop 30 has a height H2. The H1 of the front wall 35 is smaller than the height H2 of the opening 36 of the load stop 30. Even if the load stop itself would be disconnected, or disengaged from the base portion 10 of the roof box, its wedge like form would wedge the load stop between the base portion 10 and the lid 11. The rigidity of the load stop 30, formed by the first and the second side wall 33, 34 thus provides for an additional safety function in case of an accident of crash or similar.

It has been found that the load stop according to any embodiment disclosed herein can be formed by a thermoplastic material such as polycarbonates (PC), polymethyl methacrylate (PMMA), Acrylonitrile butadiene styrene (ABS), Polypropylene (PP), Polystyrene (PS), Polysulfone (PSU), Polytrimethylene terephthalate (PTT), Polyurethane (PU), Polyvinyl chloride (PVC), Polyvinylidene chloride (PVDC), Styrene-acrylonitrile (SAN), polyphenylene (SRP), or the like, or mixtures thereof.

In some embodiments it can be advantageous to choose a thermoplastic having a medium tensile strength (measured by ASTM D 638). By medium tensile strength is meant a tensile strength of 40 MPa or more, for example ABS has a recorded tensile strength of about 45 MPa and could thus in this case be a suitable thermoplastic, while Polypropylene (PP) has a recorded tensile strength of 37 MPa and would thus not be a suitable material for an embodiment requiring a medium tensile strength (source Substances & Technologies www.substech.com). In some embodiments it can be advantageous to choose a thermoplastic having a high tensile strength (measured by ASTM D 638). By high tensile strength is meant a tensile strength of 60 MPa or more, optionally 80 MPa or more.

In an embodiment, the load stop 30 is manufactured in a more rigid material than the base portion 10 of the roof box 1.

Figure 3:
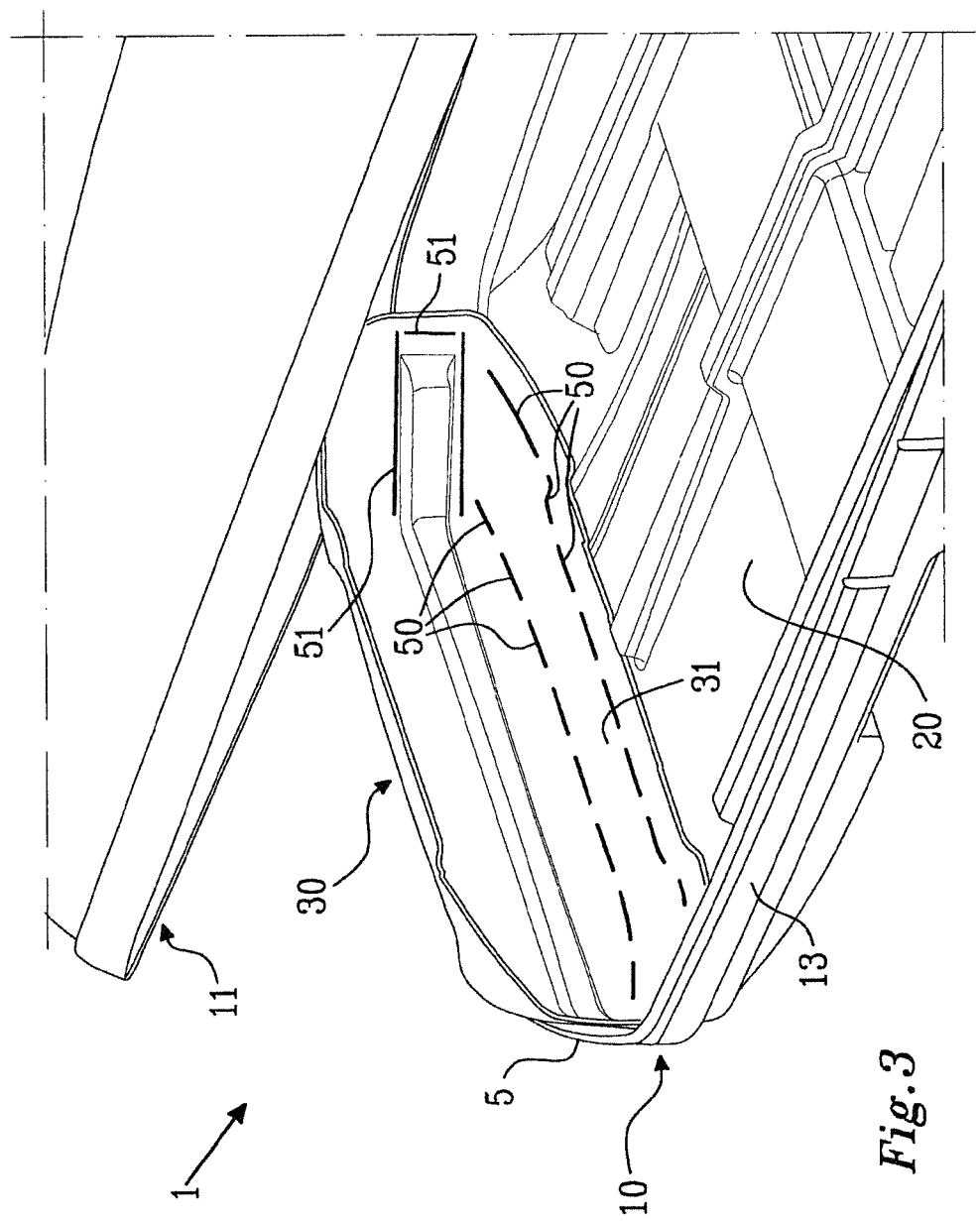
FIG. 3 shows the front end of the roof box of FIG. 2 in greater detail with the load stop transparently illustrated, and an adhesive pattern by which the load stop is adhered to the base portion of the roof box.

FIG. 3 shows the front end 5 of the roof box 1 in greater detail. The load stop 30 is transparently illustrated for the purpose of clarity. The floor portion 31 of the load stop 30 is positioned adjacent the base portion 10 of the roof box 1. It is further positioned on the load receiving area 20 at the front end 5 of the roof box 1. The load stop 30 can be attached in a number of different ways to the base portion 10 of the roof box 1; screws, bolts, rivets, welding or adhesive for example. It has however been found that adhesive is advantageous as it does not cause the structure of the load stop 30 or the base portion 10 of the roof box 1 to be weakened, adjusted or changed in any significant way. Suitable adhesives are pressure sensitive adhesives, contact adhesives, hot adhesive or hot melt adhesives, reactive adhesives such as one part, two parts or the like, synthetic adhesives or the like, or mixtures thereof. Preferred adhesives are Cyanoacrylate, Polyurethane, Epoxy and/or Acrylic adhesive.

The load stop 30 can be adhered to the base portion 10 of the roof box 1 using intermittent adhesive areas 50, optionally in regular or irregular patterns. FIG. 3 shows how the load stop 30 has been attached to the load receiving area using a regular intermittent adhesive pattern. The load stop 30 can also be attached to the periphery wall 13 of the base portion 10 of the roof box 1. In FIG. 3, an adhesive pattern 51 is shown attaching the load stop 30 to the periphery wall 13 of the base portion 10 of the roof box 1. Optionally the load stop 30 is attached to at least a first and a second section of the periphery wall 13 of the base portion 10 of the roof box 1. The load stop 30 can thus be attached to the base portion 10 of the roof box 1 at both the periphery wall 13 and the load receiving area 20 of the base portion 10 of the roof box 1.

The invention claimed is:

1. A roof box for a vehicle said roof box comprising:
    a base portion comprising a load receiving area, said base portion including a fastening structure for attachment to a roof of a vehicle;
    a closable lid disposed above said load receiving area of said base portion and adapted to retain cargo on said load receiving area of said base portion; and
    a load stop attached to the base portion,
    wherein said load stop comprises a floor portion attached to said load receiving area of said base portion, a roof portion, a first and a second side wall extending between said floor portion and said roof portion of said load stop, and a front portion,
    wherein said floor portion, roof portion, front portion and said first and said second side wall define a load receiving void with an opening,
    wherein said floor portion extends from said front portion underneath said load receiving void, said roof portion extends from said front portion above said load receiving void, and said first and said second side wall extend from said front portion on opposite sides of said load receiving void,
    wherein said front portion overlaps a junction between said base portion and said lid, and
    wherein said load stop is more rigid than said base portion.

2. The roof box according to claim 1, wherein said roof box comprises a front end and a rear end, said load stop being positioned in said front end of said roof box.

3. The roof box according to claim 1, wherein said roof box comprises a front end and a rear end and wherein a load stop is positioned in said rear end of said roof box.

4. The roof box according to claim 1, wherein said floor portion of said load stop has an area of from 3-20% of said load receiving area of said roof box.

5. The roof box according to claim 1, wherein said base portion comprises a periphery wall, and wherein said load stop is further attached to said periphery wall of said base portion of said roof box.

6. The roof box according to claim 1, wherein said load stop is manufactured from a first material and wherein at least said base portion of said roof box is manufactured from a second material, said first material being different from said second material.

7. The roof box according to claim 1, wherein said load stop is manufactured from a thermoplastic material.

8. The roof box according to claim 7, wherein said thermoplastic material is selected from the list of polycarbonates (PC), polymethyl methacrylate (PMMA), Acrylonitrile butadiene styrene (ABS), Polypropylene (PP), Polystyrene (PS), Polysulfone (PSU), Polytrimethylene terephthalate (PTT), Polyurethane (PU), Polyvinyl chloride (PVC), Polyvinylidene chloride (PVDC), Styrene-acrylonitrile (SAN), polyphenylene (SRP), or mixtures thereof.

9. The roof box according to claim 7, wherein said thermoplastic material has a tensile strength of at least 40 MPa as measured by ASTM D 638.

10. The roof box according to claim 1, wherein said load stop is attached by means of an adhesive selected from the list of: pressure sensitive adhesives, contact adhesives, hot adhesive or hot melt adhesives, reactive adhesives, synthetic adhesives, or mixtures thereof.

11. The roof box according to claim 10, wherein said load stop is attached by means of an adhesive selected from the list of: Cyanoacrylate, Polyurethane, Epoxy and/or Acrylic adhesive.

12. The roof box according to claim 10, wherein said load stop is attached using an intermittent adhesive pattern.

13. The roof box according to claim 1, wherein said base portion comprises a periphery wall, and wherein said load stop is further attached to at least one section of said periphery wall.

14. The roof box according to claim 1, wherein said roof portion of said load stop has a form that corresponds to an interior of said lid.

15. The roof box according to claim 1, wherein said load stop is positioned substantially adjacent said lid when said lid is closed.

16. A roof box for a vehicle said roof box comprising:
    a base portion comprising a load receiving area, said base portion including a fastening structure for attachment to a roof of a vehicle;
    a closable lid disposed above said load receiving area of said base portion and adapted to retain cargo on said load receiving area of said base portion; and
    a load stop attached to said base portion at a periphery wall of said base portion,
    wherein said load stop comprises a floor portion, a roof portion, a first and a second side wall extending between said floor portion and said roof portion of said load stop, and a front portion, wherein said floor portion, roof portion, front portion and said first and said second side wall define a load receiving void with an opening, wherein said floor portion extends from said front portion underneath said load receiving void, said roof portion extends from said front portion above said load receiving void, and said first and said second side wall extend from said front portion on opposite sides of said load receiving void, wherein said front portion overlaps a junction between said base portion and said lid, wherein a width of said opening is substantially the same as a width of an interior of said roof box, and wherein said load stop is more rigid than said base portion.

17. The roof box according to claim 1, wherein said roof portion of said load stop is disposed adjacent said lid when said lid is closed and spaced from said lid when said lid is open.

18. The roof box according to claim 1, wherein said floor portion, roof portion, front portion and said first and second side walls are thin.

19. The roof box according to claim 1, wherein said load stop is monolithic.

* * * * *